C. E. BALKEMA.
CORN HARVESTING MACHINE.
APPLICATION FILED DEC. 11, 1901. RENEWED JUNE 16, 1911.

1,015,281.

Patented Jan. 23, 1912.
6 SHEETS—SHEET 5.

UNITED STATES PATENT OFFICE.

CHARLES E. BALKEMA, OF LA FAYETTE, INDIANA, ASSIGNOR TO HENRY H. BLISS, TRUSTEE, OF WASHINGTON, DISTRICT OF COLUMBIA.

CORN-HARVESTING MACHINE.

1,015,281.     Specification of Letters Patent.     Patented Jan. 23, 1912.

Application filed December 11, 1901, Serial No. 85,521. Renewed June 16, 1911. Serial No. 633,563.

*To all whom it may concern:*

Be it known that I, CHARLES E. BALKEMA, a citizen of the United States, residing at La Fayette, in the county of Tippecanoe and State of Indiana, have invented certain new and useful Improvements in Corn-Harvesting Machines, of which the following is a specification, reference being had therein to the accompanying drawing.

This invention relates to that type of gathering or harvesting machine which is adapted to separate the corn ear from the standing stalk.

The objects of the invention comprises: the provision of improved means for mounting the ear picking mechanism and supporting the same from the ground; the provision of improved means for mounting such mechanism upon a vehicle; the provision of a combined ear picking and husking mechanism of improved construction, arrangement and mounting; the provision of an improved arrangement of harvesting mechanism in connection with a motor driven vehicle and of improved devices for transmitting the power from the motor to the propelling wheels and to the harvesting mechanism.

The nature of the invention and all its various objects will be understood from the following description in connection with the accompanying drawings.

This invention relates to corn harvesting and husking machinery, and comprises an ear picking mechanism, a husking mechanism, a transporting mechanism, power driving mechanism, and means for adjusting the picking mechanism relatively to the other parts. Heretofore machines of this class have been constructed in such way that the power requisite for actuating the operative parts was obtained from the transporting or traction apparatus as, for instance, from one of the ground wheels, two of such wheels being generally used.

One of the objects of the present invention is to provide for driving the operative parts independently of the ground wheels. I connect the picking and husking mechanism with a self-propelling engine, which also appears as the principal means of supporting and carrying the harvesting and husking parts. In the drawings an engine suitable for this purpose is shown, as, for instance, a four-wheeled traction engine, it having the boiler A, the steam engine, B, with the crank-shaft $b$, and the traction ground wheels at C driven by the gearing D from the crank shaft.

E, E indicate the front ground wheels on the axle $e$ under the front end of the boiler A and adapted to be used for guiding the harvesting apparatus, $e'$ indicating steering chains which are operated by the shaft $e^2$, there being a hand wheel and shaft $e^3$ connected to this chain shaft. The operator will be provided with a platform at the rear end of the mechanism in the ordinary manner.

Figures 3, 4:
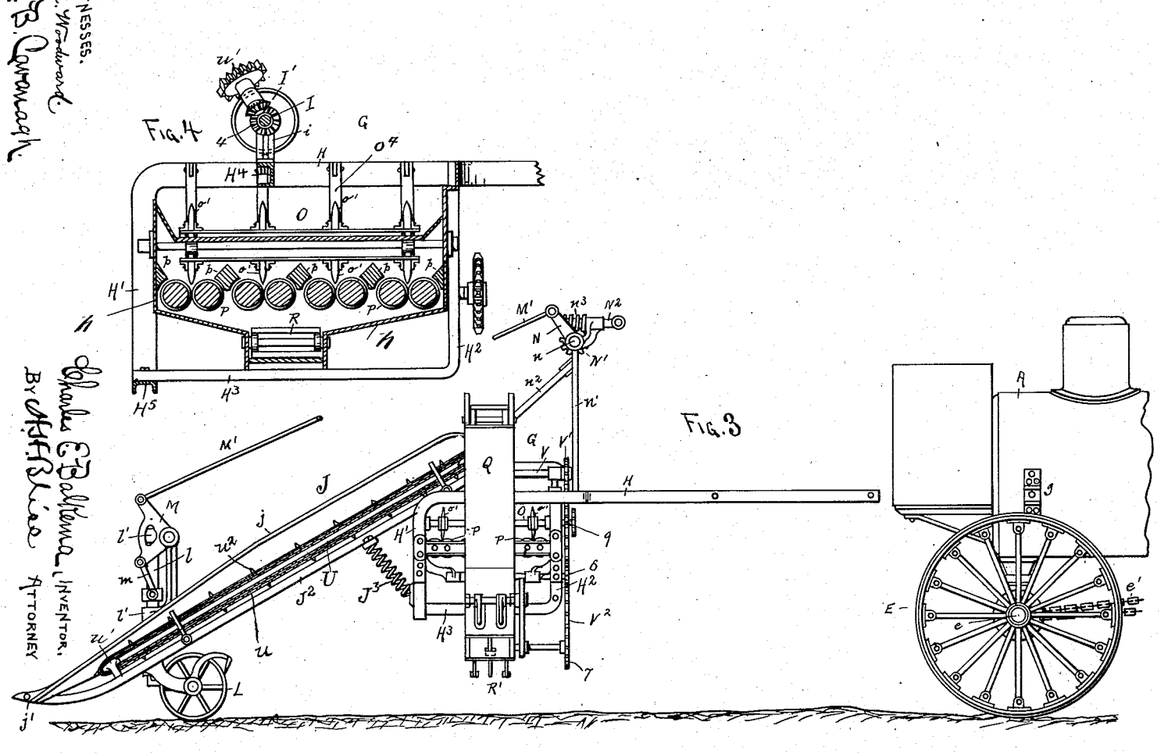
Fig. 3 is a side elevation of the harvesting and husking apparatus separated from the motor.
Fig. 4 is a cross section taken on the line $x$, $x$ of Fig. 5.
Figure 5:
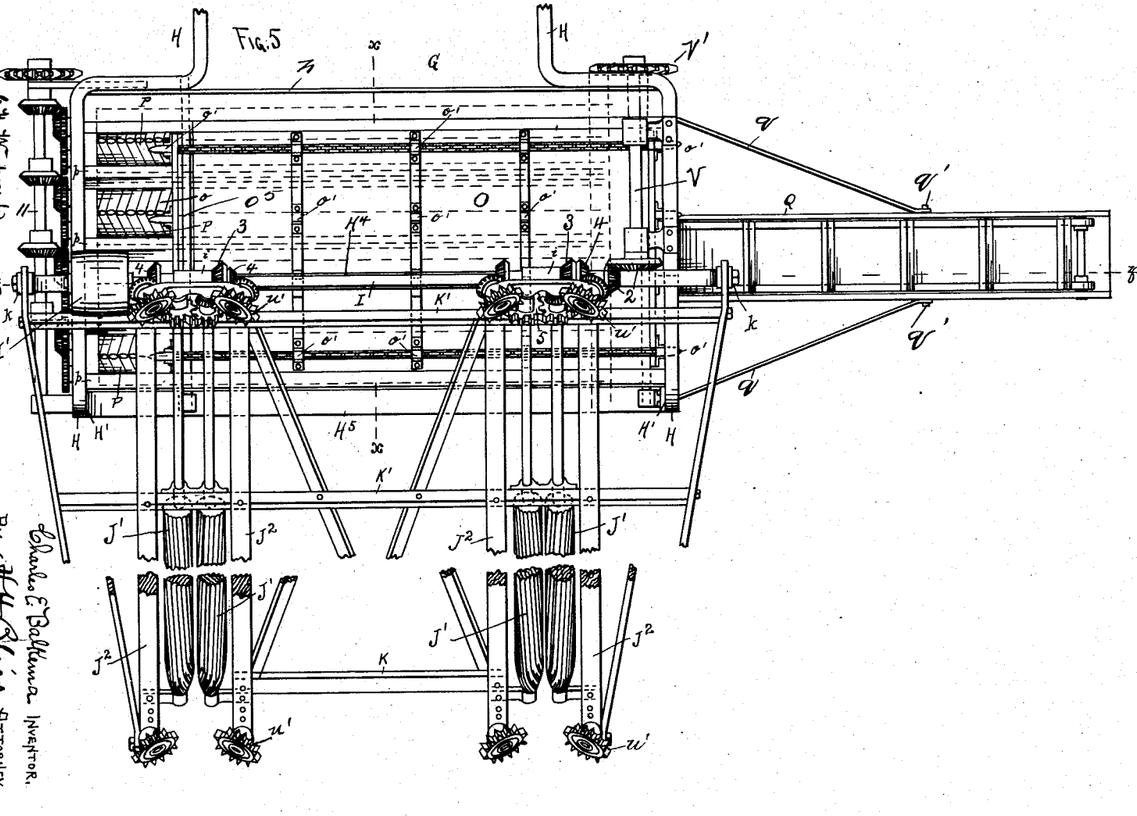
Fig. 5 is a plan view of the harvesting and husking mechanism, with a part of the lower forward portion broken away, and with the fender boards removed.

To the front end of the engine or motor part of the mechanism is secured a framework, indicated as a whole by G, it being preferably detachably secured at $g$ by brackets, as shown, and being detachable it can be removed at any time so that the engine or motor part, when of the construction shown, will be available for other purposes, as indicated by Fig. 3, which shows the two mechanisms separated.

The frame G preferably comprises the upper horizontal bars H at the sides of the vehicle, the vertical bars H′ at the front, the vertical bars H² behind those at H′ the longitudinal horizontal bars H³ suitably disposed for connecting the vertical ones, and the transverse bars H⁴ and H⁵. Upon this frame are supported brackets or standards $i$ in which is mounted a transverse shaft I. To the same axis is hinged the ear picking mechanism. This consists of two supplemental frames J, J, which extend from the shaft I downward at an inclination toward the front to points near the surface of the ground. $J^2, J^2$ are the longitudinal bars of the frames J, J. Each of the picking mechanisms has two side fender boards $j, j$, the lower ends of which diverge and are preferably curved on their lower edges as shown, the extended lower ends $j'$ being spaced apart sufficiently to run by the sides of a row of corn stalks and cause the said stalks to come to the center part of the picking mechanism. Preferably the devices that are used to force the ears from the stalks are the stripping rollers $J'$. Endless carriers or conveyers U are arranged above the stripping rollers for moving the ears of corn which have been separated from the stalks upward and rearward. These conveyers preferably consist each of a pair of endless chains $u$ supported upon sprocket wheels $u'$. The chains are provided with teeth or suitable projections and they are so disposed that the said projections $u^2\ u^2$ on the up-moving run of the conveyer enter the guideways from opposite sides as clearly represented in Fig. 2.

The two supplemental frames J, J are connected together by cross frame pieces, as at K, K', the upper end of this frame being pivotally supported by brackets $k$ in alinement with the axis of the shaft I. The frame just described is at its lower end supported upon a caster wheel L, the fork of which is secured to a standard rod $l$. This rod passes through sleeves or collars $l'$ carried by the supplemental frames of the picker mechanism. The forward end of the picker mechanism may be adjusted vertically along the standard $l$ by means of a bell lever M and a link $m$, the bell lever being pivotally connected to the upper end of the frame piece which carries the collars $l'$ in which is mounted the standard $l$ of the caster wheel.

M' is a rod extending from the bell lever M to a crank arm N on a shaft $n$. The shaft $n$ is supported in an upward extension $n'$ from the frame G, and the uper part of this frame is supported from the outer part of the frame G, as by braces $n^2$. The shaft $n$ is provided with a worm wheel N' with which meshes a worm $n^3$. The worm is fast on a shaft $N^2$, which is adapted to be actuated by a rod $n^4$ extending to the platform of the driver or engineer, where it is provided with a hand wheel $n^5$.

$J^3, J^3$ are supporting springs attached at their lower ends to the frame G and at their upper ends to a horizontal bar attached to the under sides of the bars $J^2, J^2$ of the frames J, J. These springs serve to partially support the picking mechanism so that it may be more readily and easily elevated by its elevating means and also to protect it from sudden jars incident to operating the machine over uneven or rocky ground.

It will be seen that the picking mechanism projects forward beyond the end of the frame or vehicle through which the power is applied for operating the machine, and that the connection of the picking mechanism with the framework of such vehicle is through a supporting frame which is in advance of any of the supporting wheels of the vehicle. And it will also be seen that the connection of the operating mechanism with the frame of the vehicle which propels such mechanism is flexible so that the picking mechanism is free to follow the surface of the ground immediately adjacent to where the picking takes place and is not affected by any uneven movements of the propelling vehicle.

Figure 6:
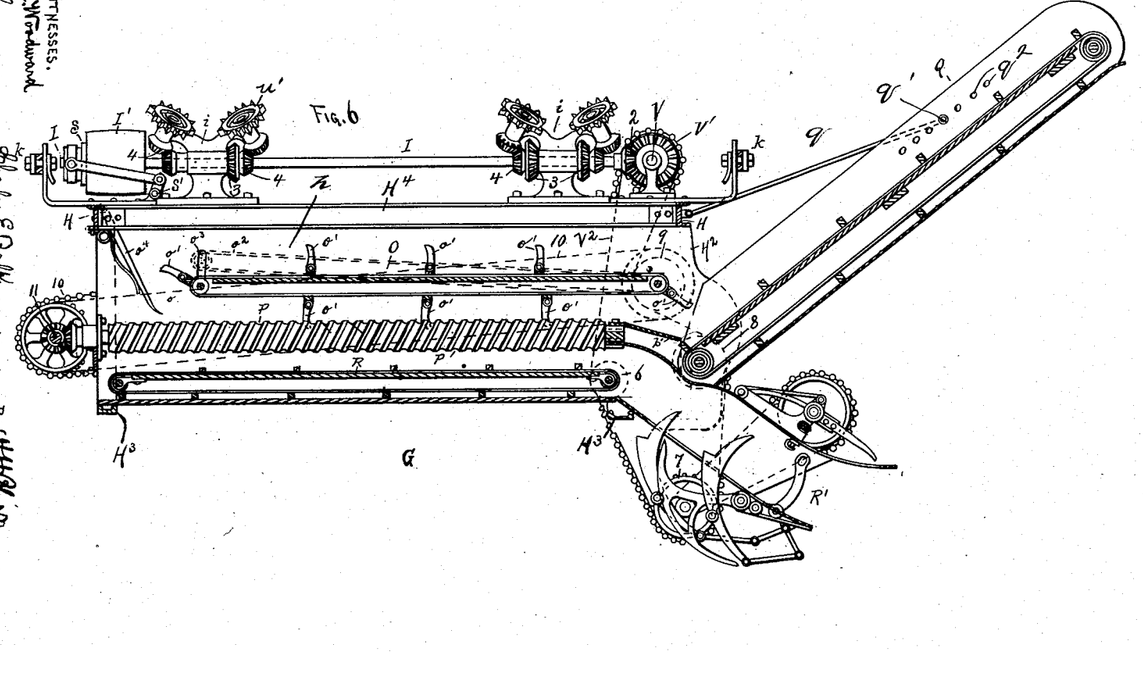
Fig. 6 is a sectional elevation on the line $z$, $z$ of Fig. 5.
Figures 7, 9:
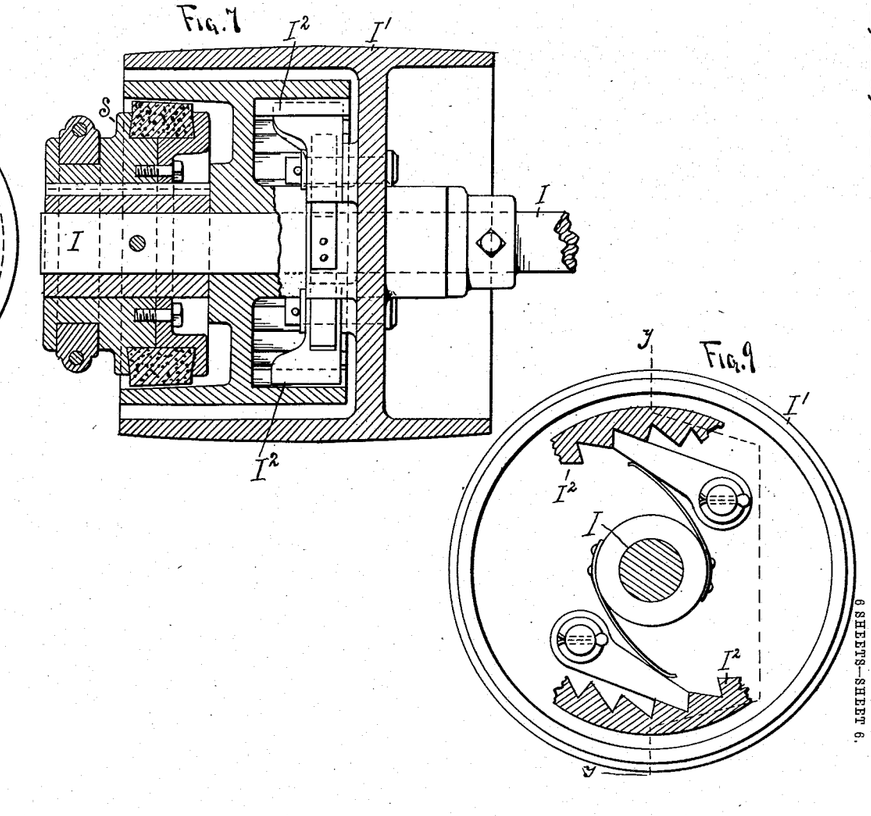
Figs. 7, 8 and 9 are enlarged sectional details of the combined backing ratchet and releasing clutch.
Figure 8:
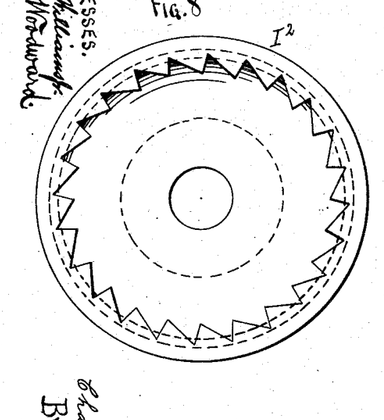

The two picking mechanisms are so disposed as to pick the ears from two adjacent rows of stalks. The separated ears are carried upward and backward by carriers U and are delivered at the upper ends of the pickers to a transverse carrier O which is arranged below the delivery ends of the carriers U. This transverse carrier receives ears from both pickers and delivers them to a chute $o$ by which they are guided downward to the husking mechanism P, which may be of any usual or preferred construction, it being represented as consisting of husking rollers and suitable guide boards or fenders $p$. The carrier O is pivoted at the end to which power is applied to it, its opposite end being free to rise and fall as indicated by the dotted lines $o^2$ in Fig. 6, so that the carrier lies as a traveling apron or conveyer above and upon the ears of corn which have been delivered to the husking mechanism, and it is thereby adapted to yield to any pressure above the normal, while at the same time it bears with sufficient weight upon the corn ears to force them into proper engagement with the husking rollers P, and to cause the carrier fingers $o'$ to force the ears forward over the husking mechanism. These fingers $o'$ are spring-supported and while strong enough to properly move the ears under ordinary conditions, will yield to an abnormal resistance which would otherwise endanger the carrier. The carrier and the husking rollers are inclosed on the bottom and sides by a casing $h$ rigidly secured to the frame G. The shaft $o^5$ at the free end of the carrier O has its ends extending through slots $O^3$ in the side walls of the casing $h$, so that the rising and falling movements of the carrier are properly guided and limited.

In the chute o at the free end of the carrier O, there are arranged guiding and directing fingers $o^4$ which are arranged to properly guide the ears of corn as they are delivered by the carrier to the husking rollers. These fingers are preferably spring supported. The husked ears of corn pass from the husking rollers P over a chute or guideway $p'$ to an inclined delivery carrier Q hinged to one side of the machine and supported by rods $q$, $q$, which are secured at their outer ends to bolts or pins $q'$, $q'$ in the sides of carrier Q, a series of holes $q^2$ being provided for the bolts or pins so that the carrier can readily be adjusted to a proper height to deliver the corn into a wagon or other receptacle. Below the husking rollers there is arranged a transverse carrier R to receive the husks as they are removed from the ears, and to convey them to a binding mechanism R' by which they may be bound into bundles and thus preserved.

The picking mechanism, the husking mechanism, the several carriers or conveyers, and the binding mechanism, are arranged by preference to be driven from the crank shaft $b$ of the engine. The fly wheel F of the engine is belted to a pulley I' on the shaft I, which serves as the prime power shaft of the picking and harvesting mechanism. Upon this shaft I there are several sets of gears which, with the parts coöperating therewith, constitute the gearing for driving the various parts of the harvesting mechanism.

3 indicates bevel gearing arranged between the shaft I and the shafts of the picker rolls J'.

4 indicates bevel gearing arranged between the shaft I and the inclined shafts upon which are secured the sprocket wheels $u'$ of the conveyers U, and 2 indicates bevel gearing arranged between the shaft I and a counter shaft V, suitably supported in the frame G preferably at the side thereof opposite the pulley I'. Upon this shaft V there is a sprocket wheel V'; and the sprocket chain $V^2$ which engages therewith also engages with and drives wheels 6, 7, 8 and 9, and these wheels in turn constitute parts of the driving mechanism for the husk carrier R, the binder R', the husked ear carrier Q, and the transverse carrier O. The driving shaft of the carrier O is connected by a sprocket chain or belt 10 with a shaft 11, which, by suitable gearing, is connected with and drives the husking rollers P. The engine operates both to propel the apparatus as a whole and to move the various operative parts of the harvesting mechanism, and I have so arranged the connecting gearing between the engine and the several parts driven thereby, that each may be operated independently of the other as circumstances may require.

At F' there is arranged a clutch which connects the crank shaft $b$ of the engine with the traction gearing and ground wheels of the propelling mechanism. Shifting mechanism $F^2$ serves to move the clutch into and out of engagement with the fly wheel F. When this clutch is in action the machine as a whole will be propelled over the ground. When it is out of action, the machine will not be propelled, but if the engine continues in operation the picking and husking mechanisms may nevertheless be driven, and in this way the last said mechanisms may be caused to free themselves in case there shall be any clogging or overloading of their parts. The clutch F' is the well known form of friction clutch, shown in United States Patent to Avery, No. 537,263, and I, therefore, do not deem it necessary to describe the same in detail.

The driven pulley I' is loose on the shaft I, and is connected therewith through a clutch mechanism indicated at S. This clutch mechanism may be operated in any well known manner as by a rod $s'$ leading to the engineer's platform. By this arrangement the harvesting mechanism may be thrown out of gear with the engine whenever required, as when the apparatus is moved from place to place. In order that the harvesting mechanism shall not be run backward, should at any time the engine be reversed, I prefer to interpose a backing ratchet mechanism $I^2$ between the pulley I' and the clutch S.

The clutch F' is operated by the engineer through suitable shifting mechanism $F^2$, and by these means it is possible to control and to vary the speed at which the apparatus is propelled, without varying the speed of the motor. Thus should the harvester approach a part of the field when the conditions were such that the harvesting machine could not properly take care of the ears, if the machine were propelled at ordinary speed, the engineer would, by means of the shifting devices $F^2$, so move the friction clutch as to permit of the parts thereof slipping upon each other sufficiently to reduce the speed of the traction apparatus while at the same time the speed of the operating parts of the harvester is maintained. The clutch F' and its operating mechanism thus becomes a means for imparting a variable speed from the continuously rotating power shaft to the traction mechanism.

Figures 1, 10:
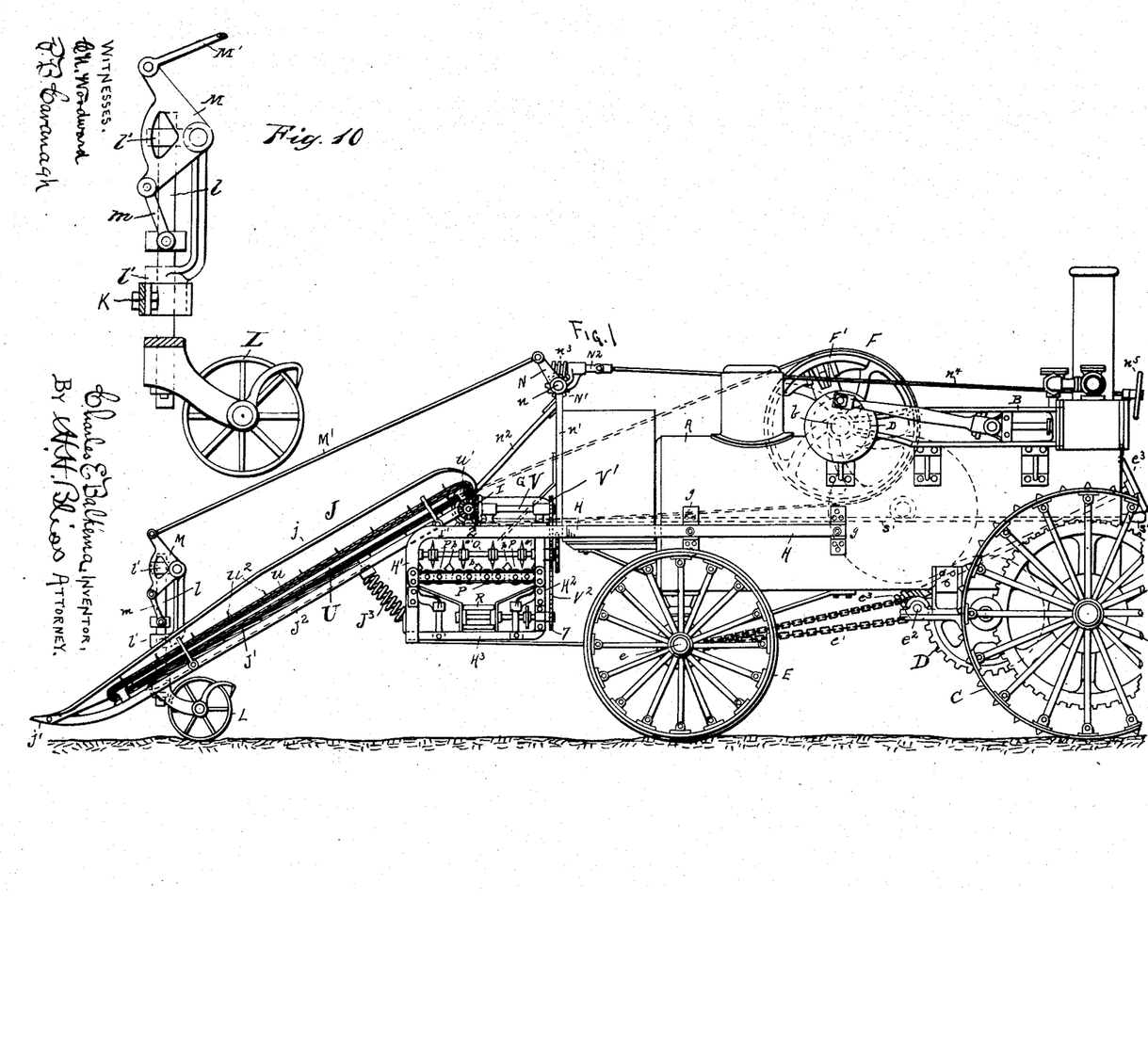
Figure 1 is a side elevation of a mechanism embodying my improvements.
Fig. 10 is a side view of the means for supporting and adjusting vertically the forward end of the harvesting and husking mechanism.
Figures 2, 11:
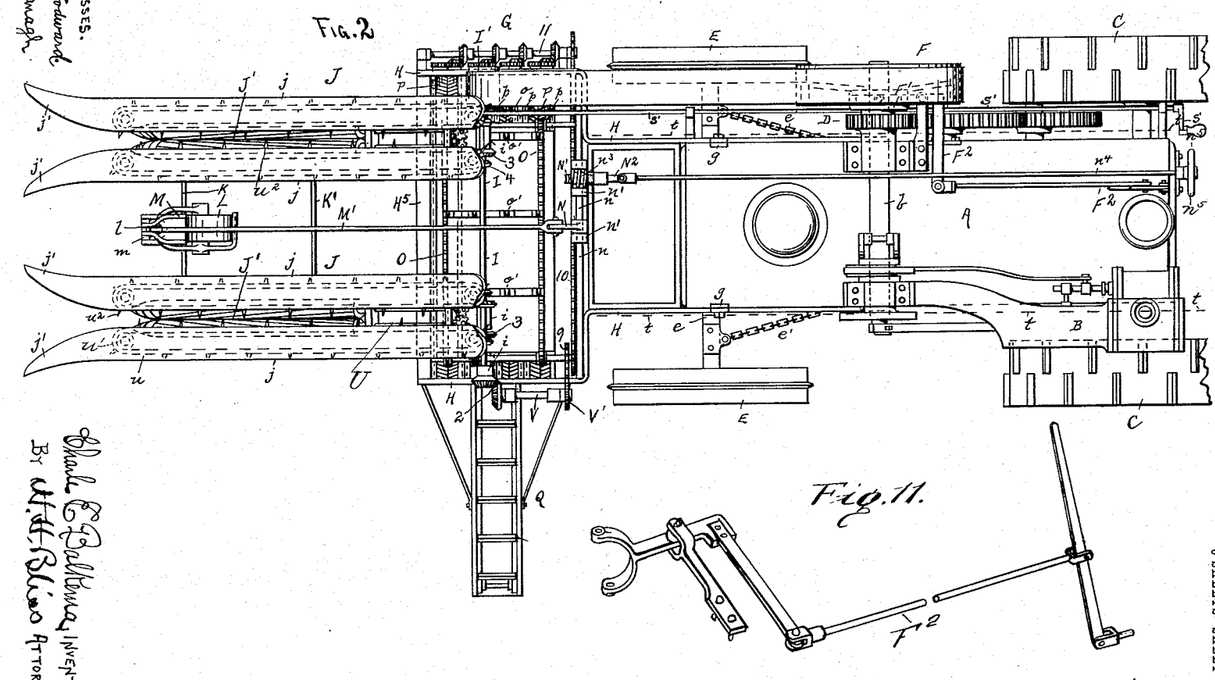
Fig. 2 is a plan view of the same.
Fig. 11 is a perspective view of the clutch shifting mechanism.

It will be noted that the traction wheels C and the steering wheels E of the motor are far enough apart on their axles to extend over the two rows of corn stalks to be harvested, and will pass over the denuded stalks after they are released from the picking mechanism, as indicated by the dotted lines $t$ in Fig. 2, which indicate the lines of the corn rows.

What I claim is:—

1. In a corn harvesting apparatus, the combination of a vehicle, the mechanism through which power for propelling the apparatus is transmitted, a detachable frame rigidly connected to the vehicle, and an ear-picking mechanism hinged to the said detachable frame, the hinge of the ear-picking mechanism being in advance of the forward supporting wheels of the vehicle, substantially as set forth.

2. In a corn harvesting and husking apparatus, the combination of the vehicle having front and rear supporting wheels, the frame rigidly secured on the front end of the vehicle, the husking mechanism mounted in said frame, the ear-picking mechanism hinged at its upper rear end to said frame, and the ground-engaging support for the front end of said picking mechanism, substantially as set forth.

3. In a corn harvesting apparatus, the combination of a vehicle, the mechanism through which power for propelling the apparatus is transmitted, a frame rigidly supported by the said vehicle arranged in the vertical, longitudinal planes thereof and extending forward from said vehicle, a picking mechanism hinged to the said rigid frame whereby its forward end is free to follow the surface of the ground, and side delivery mechanism for the picked ears arranged between the picking mechanism and the vehicle, substantially as set forth.

4. In a corn harvesting machine, the combination of a vehicle, the mechanism through which power for propelling the apparatus is transmitted, a frame rigidly supported by the said vehicle arranged in the vertical by longitudinal planes thereof, and extending forward from said vehicle, a picking mechanism hinged to the said rigid frame, and side delivery mechanism for the picked ears mounted in the said rigid frame, substantially as set forth.

5. A self propelling corn harvesting machine comprising a motor vehicle, a detachable frame rigidly secured to one end of the motor vehicle, an ear-picking mechanism hinged to the said detachable frame and arranged to have its front end follow the surface of the ground, driving gearing arranged between the motor and the traction wheels, and driving gearing arranged between the motor and the ear-picking mechanism, respectively, a clutch device being arranged in each of the said sets of driving gearing, the one for the ear picking mechanism being detachable therewith, substantially as set forth.

6. In a corn harvesting machine, the combination of a plurality of ear-picking devices arranged to discharge the ears at their rear ends, a single transversely arranged conveyer that receives the picked ears from the several ear-picking devices, a transversely arranged husking mechanism comprising a plurality of sets of husking rolls arranged side by side and beneath the said conveyer, and a single husk conveyer arranged below the sets of husking rolls, substantially as set forth.

7. The combination with a traction engine, of a detachable corn harvesting and husking apparatus comprising a frame rigidly secured on the front end of said engine, ear-husking mechanism mounted in said frame, ear-picking mechanism pivotally mounted at its upper rear end on said frame, and a ground-engaging support for the front end of said mechanism, substantially as set forth.

8. The combination with a traction engine, of a detachable corn harvesting and husking apparatus, comprising a frame rigidly secured on the front end of the engine, ear-husking rolls mounted in said frame transversely of the engine, a husk conveyer beneath the rolls, husk binding mechanism mounted on the frame at the end of said conveyer, ear-picking mechanism pivotally mounted at its upper rear end on said frame, and a ground-engaging support for the front end of said picking mechanism, substantially as set forth.

9. In a corn harvesting machine, the combination of a motor vehicle, a detachable framework supported at and projecting from the front end of the vehicle, a corn-ear-picking mechanism having its upper rear end hinged to the said frame, a supplemental ground wheel below the said picking mechanism, and in the rear of the front end thereof, and means on the motor vehicle for adjusting the ear-picking mechanism on said supplemental ground wheel, substantially as set forth.

10. In a corn picking and husking mechanism, the combination of the four wheeled power vehicle having two ground steering wheels, a transversely arranged frame supported on and across the front end of said vehicle, a series of pairs of transversely mounted corn husking rolls in the said frame, a forwardly extending downwardly inclined corn-ear-picking mechanism having its upper rear end hinged above the said husking rollers, and means below the front end of the adjustable picker frame supplemental to those aforesaid for supporting it from the ground, substantially as set forth.

11. The combination with a traction engine, of a detachable corn harvesting and husking apparatus, comprising a frame rigidly mounted on the front end of the engine, ear-husking rolls mounted in said frame transversely of the engine, a conveyer to receive the picked ears mounted in the frame above and parallel with the rolls so as to discharge at one end thereof, ear-delivery mechanism at the other end of the rolls, a plurality of ear-picking devices, a supporting frame for said devices hinged at its upper rear end to the rigid frame, and a ground-engaging support for the front end of said hinged frame, substantially as set forth.

In testimony whereof I affix my signature in presence of two witnesses.

CHARLES E. BALKEMA.

Witnesses:
ROBERT RARIDEN,
JOHN D. GOUGAR.